United States Patent
Shimizu et al.

(10) Patent No.: US 6,785,398 B1
(45) Date of Patent: Aug. 31, 2004

(54) MOTION PICTURE ELECTRONIC WATERMARK SYSTEM

(75) Inventors: Shuichi Shimizu, Yokohama (JP); Akio Koide, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/266,526

(22) Filed: Mar. 11, 1999

(30) Foreign Application Priority Data

Mar. 24, 1998 (JP) .......................................... 10-075516

(51) Int. Cl.$^7$ ................................................ G06K 9/00
(52) U.S. Cl. ........................ 382/100; 713/176; 386/94
(58) Field of Search ................................ 382/100, 233, 382/236, 276; 713/176; 386/94; 380/200, 235, 203, 34; 710/62; 704/200.1

(56) References Cited

U.S. PATENT DOCUMENTS

| 6,289,128 | B1 | * | 9/2001 | Allen ........................... 341/51 |
| 6,310,962 | B1 | * | 10/2001 | Chung et al. ............... 382/100 |
| 6,462,681 | B1 | * | 10/2002 | Van Der Vleuten et al. .. 341/50 |
| 2001/0021260 | A1 | * | 9/2001 | Chung et al. ............... 382/100 |
| 2001/0028725 | A1 | * | 10/2001 | Nakagawa et al. ......... 382/100 |
| 2002/0150247 | A1 | * | 10/2002 | Linnartz et al. ............ 380/205 |
| 2002/0168007 | A1 | * | 11/2002 | Lee ....................... 375/240.03 |
| 2002/0168069 | A1 | * | 11/2002 | Tehranchi et al. .......... 380/235 |
| 2002/0191810 | A1 | * | 12/2002 | Fudge et al. ................ 382/100 |

* cited by examiner

*Primary Examiner*—Bhavesh M. Mehta
*Assistant Examiner*—Barry Choobin
(74) *Attorney, Agent, or Firm*—Thomas A. Beck; Louis P. Herzberg

(57) ABSTRACT

To provide an electronic watermark method and system for which the detection reliability of embedded information does not depend on the strength of signals that are measured in frames. To achieve the above object, information is prepared for embedding as a bit stream, the sign of the bit stream being changed in accordance with a sign inversion cycle, and the bit stream being embedded in a frame. As for detection of information, values obtained through observation of frames are accumulated, and the accumulated values are compared with threshold values that are varied in accordance with the accumulated values obtained by observation. The comparison results are then employed to detect the embedded information.

5 Claims, 9 Drawing Sheets

$$U[i] = \frac{1}{\sqrt{f}} (V\_(k+1)[i]) + (V\_(k+2)[i]) + \ldots + (V\_(k+f)[i])$$

Fig. 13

MOTION PICTURE ELECTRONIC WATERMARK SYSTEM

FIELD OF THE INVENTION

The present invention relates to an electronic watermark technique for embedding additional invisible information in digital motion pictures, and in particular, to a detection technique for which accumulation of signals is used to achieve detection providing a high level of reliability, even when the embedded signal is weak.

BACKGROUND ART

Generally, since the resolution of a motion picture is higher than that of a still picture, a signal embedded in a motion picture must be weaker than is a signal embedded in a still picture so that image quality can be maintained. Even if a strong signal is embedded, it is considerably attenuated after being subjected to a low-pass filter or to MPEG2 compression. Therefore, in a method for detecting signals independently in each frame, or a method for detecting signals in a fixed number of frames, since the strength of the signals to be measured depends on the compression process, the reliability of the detection is not always high. If a threshold value for enhancing the reliability is set, another problem arises that embedded signals can not be detected at all (false negatives).

A method is required whereby the reliability of the detection does not depend on the strength of a signal that is measured in a single frame.

However, means for resolving the problem are not taught in the "data hiding method and data extraction method employing statistical inspection" disclosed in Japanese Patent Application No. Hei 8-348426, the "data hiding method and system employing statistical property" disclosed in Japanese Patent Application No. Hei 8-345568, and the "multiple frame data hiding method and detection method" disclosed in Japanese Patent Application No. Hei 9-88493.

SUMMARY OF THE INVENTION

Problems to be Solved by the Invention

It is, therefore, one object of the present invention to provide an electronic watermark method and system for which the detection reliability of embedded information does not depend on the strength of signals that are measured in frames.

It is another object of the present invention to provide an electronic watermark detection method and system for detecting embedded information based on a statistical observation value for each motion picture frame.

It is an additional object of the present invention to provide an electronic watermark detection method and system for changing a sign before accumulating a value obtained through observation of a motion picture frame.

It is a further object of the present invention to provide an electronic watermark detection method and system that can cancel a correlation (dependency) of sequential motion picture frames.

It is still another object of the present invention to provide an electronic watermark method and system for changing a sign of a signal to be embedded before information is embedded.

It is still an additional object of the present invention to provide an electronic watermark method and system for changing the signs of embedded signals at specific intervals.

It is a still further object of the present invention to provide an electronic watermark detection method and system for preventing an increase in a difference between sequential motion picture frames.

It is yet another object of the present invention to provide an effective method and system for a compression method, such as MPEG2 by using a difference.

It is yet an additional object of the present invention to provide a method and system with which synchronization, as it is related to signs, of an embedding process and a detection process is not required.

To achieve the above objects, information is prepared for embedding as a bit stream, the sign of the bit stream being changed in accordance with a sign inversion cycle, and the bit stream being embedded in a frame.

BRIEF DESCRIPTION OF THE DRAWINGS

FIG. 6 is a diagram showing sign inversion for a long cycle and an observation method employed every half cycle.

FIG. 7 is a diagram showing an accumulation method when an embedding cycle and a detection cycle do not match.

FIG. 8 is a diagram showing another accumulation method when an embedding cycle and a detection cycle do not match.

Figure 13:
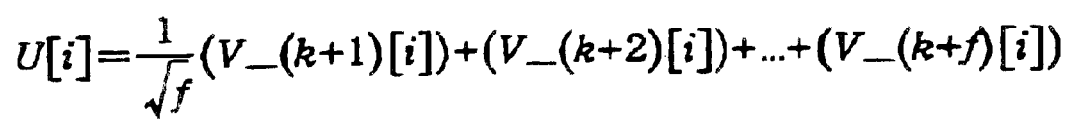

FIG. 13 is an equation for carrying values obtained by observation of a frame to a succeeding frame and for determining the presence of an embedded signal using the sum of two values.

DETAILED DESCRIPTION OF THE INVENTION

Figure 1:
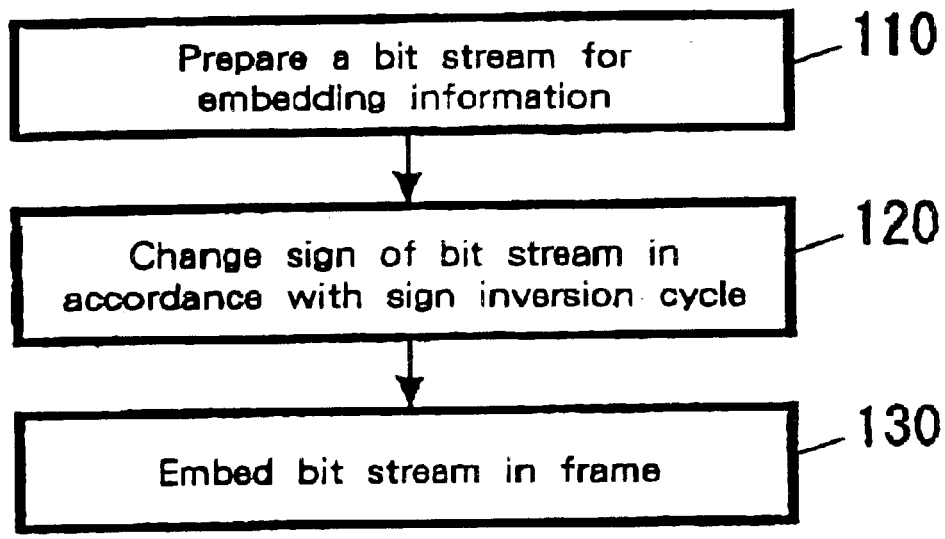
FIG. 1 is a flowchart for the information embedding processing according to the present invention.

FIG. 1 is a flowchart for the information embedding process according to the present invention. First, block 110 is a bit stream preparation block at which information is prepared for embedding as a bit stream. Block 120 is a bit stream sign change block at which the sign of a bit stream is changed in accordance with a sign inversion cycle. Finally, block 130 is a bit stream embedding block at which a bit stream is embedded in a motion picture frame.

As for detection of information, values obtained through observation of frames are accumulated, and the accumulated values are compared with threshold values that are varied in accordance with the accumulated values obtained by observation. The comparison results are then employed to detect the embedded information.

Figure 2:
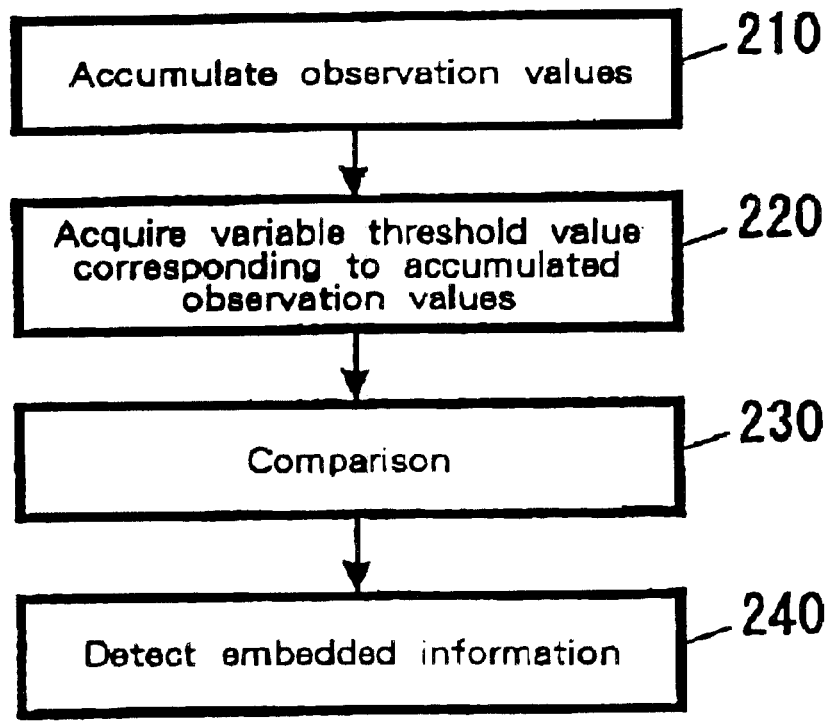
FIG. 2 is a flowchart for the information detection processing according to the present invention.

FIG. 2 is a flowchart showing the detection of information according to the present invention. Block 210 is an observation accumulation block at which values obtained by observation of frames are accumulated. Block 220 is a variable threshold value acquisition block at which variable threshold values are acquired corresponding to the accumulated values. Block 230 is a comparison block at which the accumulated values obtained by observation are compared with variable threshold values that correspond to the accumulated values. Finally, block 240 is an information detection block at which embedded information is detected in accordance with the comparison results.

Preferred Embodiment

According to an electronic watermark method using statistical probability properties for values obtained by observation (disclosed in Japanese Patent Application No. Hei 8-348426 and No. Hei 8-345568), m values (V[1], V[2], . . . , V[m]), the value for each frame is measured from each frame and interpreted as bit information to accomplish the embedding/detection of m bits. In this case, it is assumed that the values obtained by observation of frames having no embedded information, i.e., values for noise observed as signals, can be approximated using the normal distribution. If the approximation to the normal distribution is correct, such a false positive error that noise is interpreted as a signal can be predicted, and the threshold value T can be determined in order to adjust the error rate to that of a target value.

The bit information can be embedded in an image by processing image data so that the individual observation values (V[i]) extend beyond the threshold value T. However, V[i] does not always exceed the threshold value T because it is attenuated by the effect of the compression process, or is attenuated in order to maintain the image quality. In this case, a false negative error occurs such that an embedded signal can not be detected even though it is present.

To resolve this problem, provided is a method for carrying the value obtained by observation of a frame to a succeeding frame and for determining the presence of an embedded signal using the sum of the two values. When two frames are not adequate, the number of frames observed is increased and signals are accumulated in order to determine the presence of a signal. As an assumption in this case, the values obtained by observation of the individual frames must be consonant with their normal distribution and must be independent of each other. When f random variables that are independent and are consonant with the normal distribution of variance 1 are added together, the result is a random variable for variance f. Therefore, it is predicted that the accumulated value of noise obtained by observation will be increased at a speed in proportion to √f. This phenomenon can be generally regarded as a random walk. On the other hand, since the value of a signal obtained by observation is intentionally provided so that it will not be distributed, the value obtained by observation is expected to increase in proportion to /f. Thus, when the accumulated value U[i] is normalized by dividing it by √f:

FIG. 13

$$U[i] = \frac{1}{\sqrt{f}}(V\_(k+1)[i] + (V\_(k+2)[i] + \ldots + (V\_(k+f)[i])$$

wherein a value for noise obtained by observation can be regarded as a random variable having the normal distribution of variance 1. V_i[i] represents the statistical value of the i-th bit obtained by observation of the j-th frame, and can, therefore, be compared with the fixed threshold value T. Since the accumulated value U[i] for a signal is increased in proportion to √f, so long as f is satisfactorily large, the value U[i] can exceed the fixed threshold value T. According to this method, even when an embedded signal is considerably attenuated, so long as the signs for the values accumulated for the frames are substantially uniform, the false negative error can be approximated and brought as close as zero by increasing the number of accumulated frames.

* Exclusion of Correlation of Sequential Frames

Generally, sequential motion picture frames strongly correlate with each other. In other words, because frames differ little from each other and strongly correlate with each other, they can be replayed as motion pictures. In an extreme case, the correlation coefficient is the maximum for motion pictures in which the same contents are repeated. In this case, an assumption that the accumulated value U[i] follows the normal distribution for variance 1 is not established. Therefore, a process for canceling the correlation is required.

In this process, when the observation values obtained from the individual frames are added together, the order of their signs is inverted. Then, even when the same contents are repeated, the accumulated value U[i] is not increased and oscillates a little around 0, and its amplitude is reduced in proportion to 1/√f. Further, if the signs of the observation values that are independent of each other are inverted, their independence is not affected. In the embedding process, as well as in the detection process, the signs of the signals to be embedded are sequentially inverted.

Figure 3:
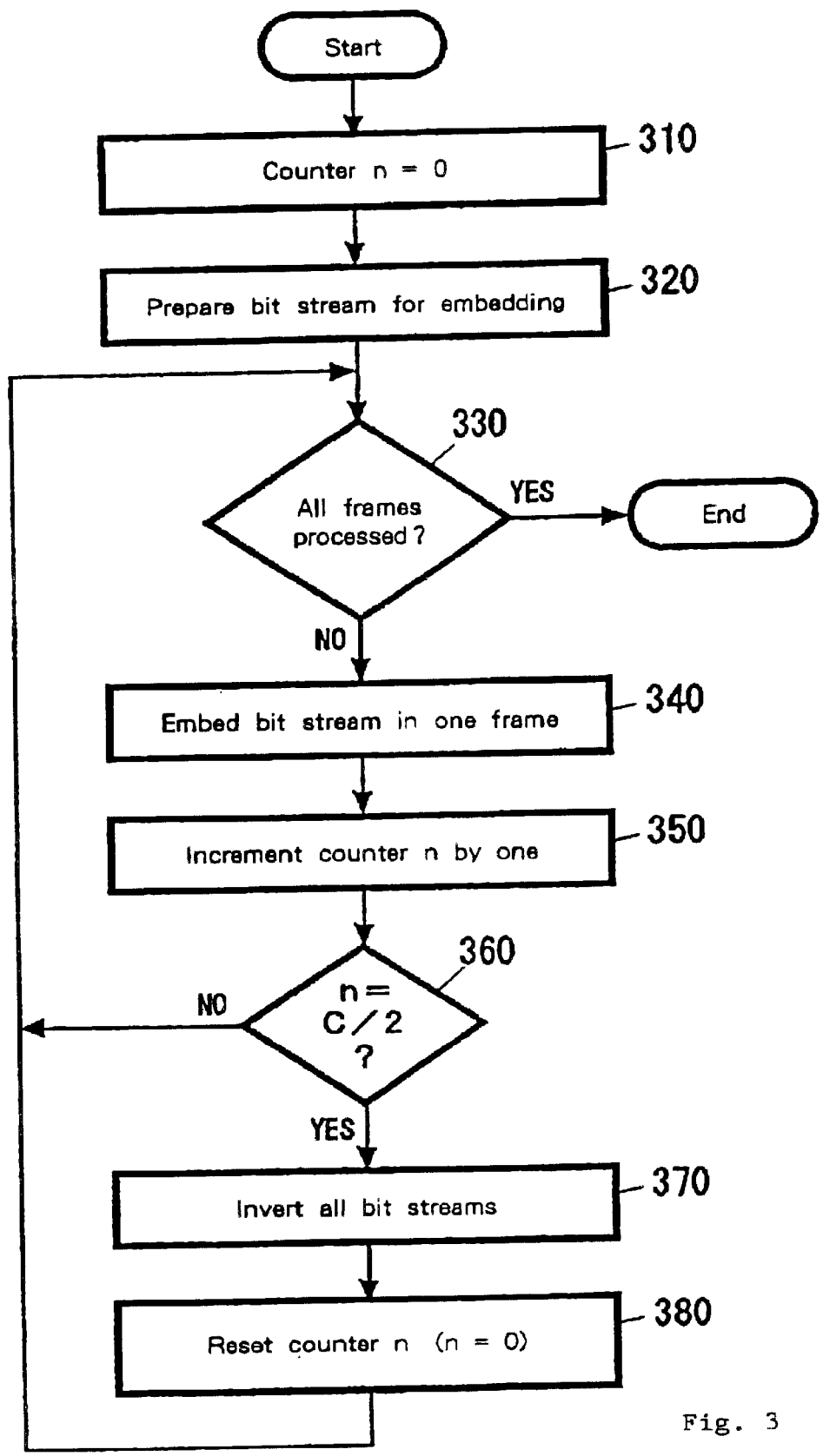
FIG. 3 is a flowchart for embedding processing where the sign of an embedded signal is changed in accordance with the sign inversion cycle.

FIG. 3 is a flowchart showing the embedding processing by which the sign of an embedded signal is changed in accordance with a sign inversion cycle. One sign inversion cycle, as well as a wave cycle, is defined as a set comprising a half cycle of + and a half cycle of −. In other words, with a wavelength of 10, the sign is changed at the step of the wavelength for 5. Since in FIG. 3 the sign inversion cycle is defined as C, the sign is inverted every C/2 cycle and information is embedded. At step 310 a counter n is set to 0. At step 320 a bit stream is prepared for embedding, and at step 330 a check is performed to determine whether all the frames have been processed. If the decision is YES, the processing is thereafter terminated. If the decision is NO, program control moves to step 340. At step 340, the bit stream is embedded in one frame, and at step 350 the counter n is incremented by one. At step 360 a check is performed to determine whether the sign inversion cycle has been reached. If the decision is NO, program control returns to step 330. If the decision is YES, program control advances to step 370, whereat the bit stream is inverted. At step 380 the counter n is reset, and program control thereafter returns to step 330.

\* Avoid Bit Interpretation Inversion Due to Addition of a Sign Bit

In a method for employing the sign of the observation value U[i] to interpret a bit, i.e., for interpreting a bit as "1" when the sign is positive and as "0" when the sign is negative, synchronization concerning the sign is required for the embedding process and the detection process, although it is difficult to synchronize the two processes. Otherwise, the interpreted bit is inverted (e.g., from "101" to "010") and causes an erroneous interpretation.

Thus, the method is provided for adding a sign bit to bits to be embedded and for embedding a total of m+1 bits. A bit having the same sign as the sign bit is interpreted as a bit "1," and a bit having the opposite sign is interpreted as a bit "0" to prevent bits from being inverted. When, for example, "101+1" is inverted and becomes "010+0," the interpreted bit is "101" since the sign bit is "0." As is described above, the property is employed whereby all of m+1 bits are inverted when the sign is inverted.

\* Sign Inversion for a Long Cycle and Observation for Every Half Cycle

When the sign for the embedded process is changed for two sequential frames, a difference between the two frames is double that in the embedding process. The increase in the difference between the two sequential frames greatly affects a compression method, such as MPEG2, that employs a difference, and causes deterioration of the compression rate. When a filter is employed that removes noise to reduce the difference between the sequential frames, an embedded signal will be considerably attenuated and lost.

Figures 6, 7, 8:
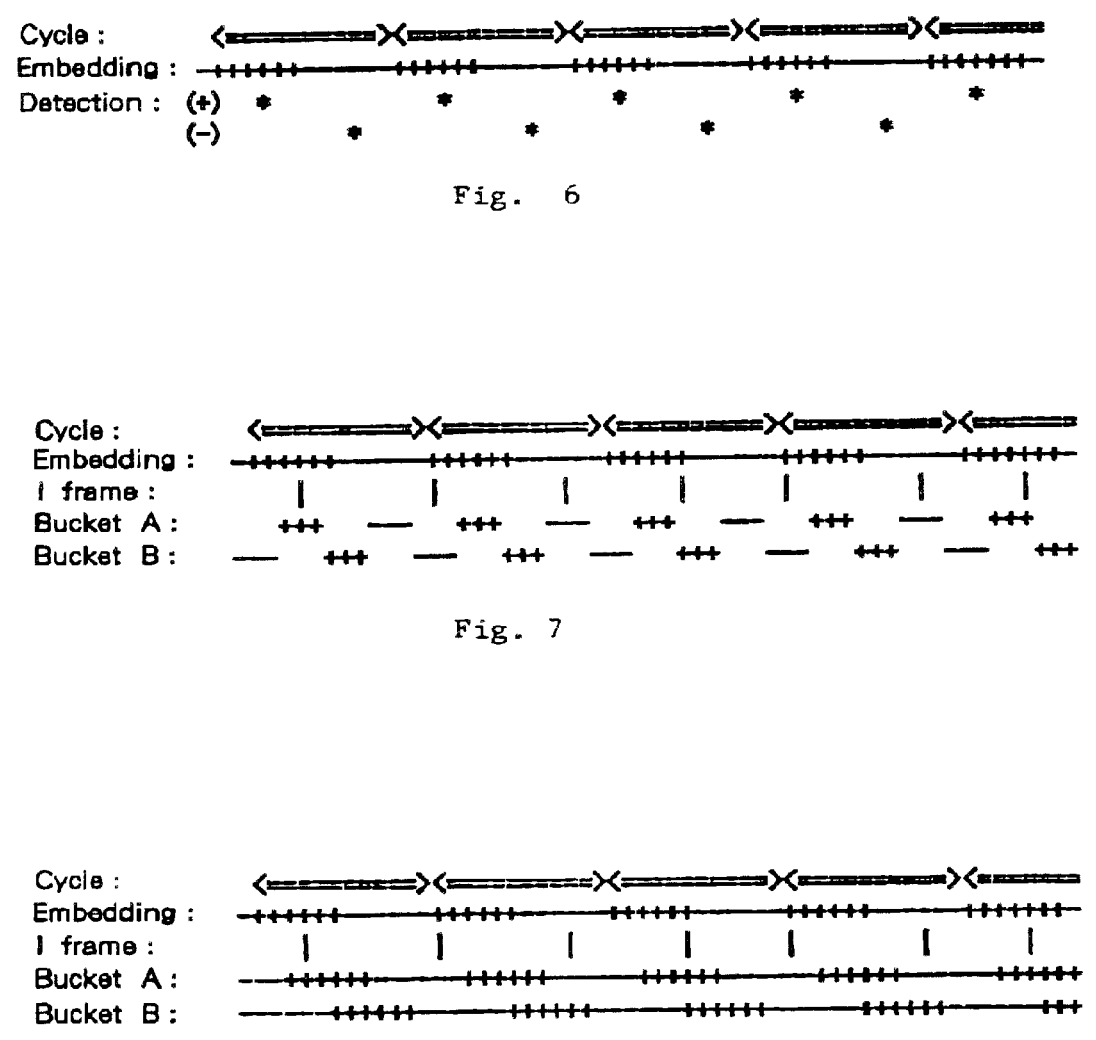

To avoid this problem, the sign inversion cycle C must be extended in order to prevent the change between adjacent frames. The observation is performed every half cycle (C/2), and when the values obtained by observation are accumulated with changed signs, as is shown in FIG. 6, embedded signals can be collected.

Figure 4:
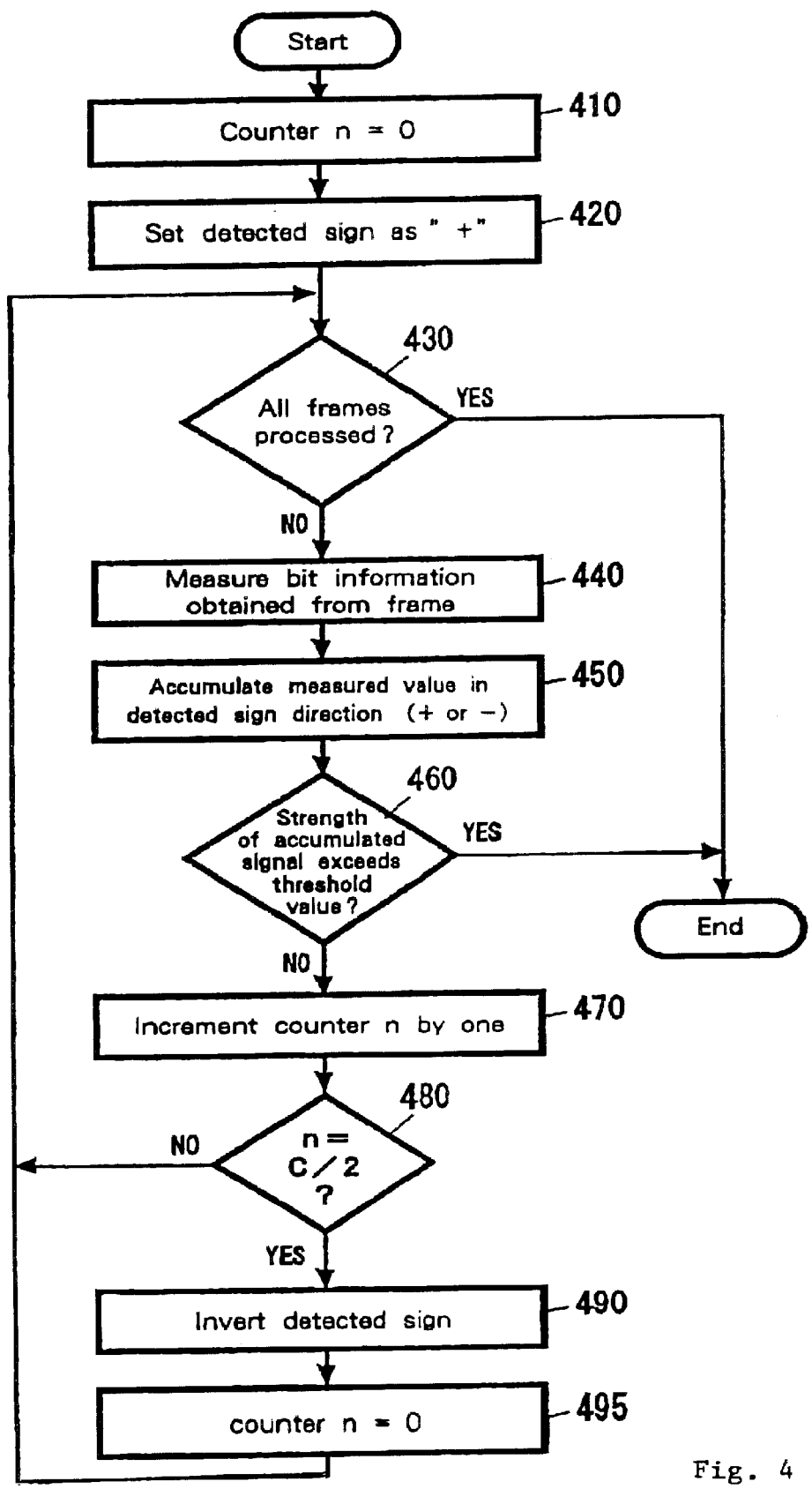
FIG. 4 is a flowchart for sign inversion for a long cycle and signal detection obtained by observation every half cycle.

FIG. 4 is a flowchart for sign inversion for a long cycle, and the detection of signals through observations performed every half cycle. At step 410 the counter n is set to 0. At step 420 the sign for detection is set to "+," and at step 430 a check is performed to determine whether all the frames have been processed. When the decision is YES, the processing is thereafter terminated. When the decision is NO, program control moves to step 440, whereat bit information in a frame is measured. Then, at step 450 the measured value is accumulated in the direction of the detection sign ("+" or "−"). At step 460 a check is performed to determine whether the strength of the accumulated signal exceeds the threshold value. If the decision is YES, the processing is thereafter terminated. If the decision is NO, program control advances to step 470, whereat the counter n is incremented by one. At step 480, a check is performed to determine whether the sign inversion cycle is reached. If the decision is NO, program control returns to step 430. If the decision is YES, program control moves to step 490, whereat the detected sign is inverted, and then to step 495, whereat the counter n is reset to 0. Program control thereafter returns to step 430.

\* Accumulation Method 1 Employed When an Embedding Cycle and a Detection Cycle Are Not Synchronized For the MPEG2 compression, self-replaying compression is performed for only the I frame of the I , P and B frames, and compression using a difference is performed for the other two frames. Thus, the detection performed by observing only the I frame is preferable as far as the cost is concerned; however, according to the MPEG2 standards, the cycle in which the I frame appears is not fixed but is variable, and is, therefore, not always synchronized with the cycle of the embedded signal. If the cycles do not match, the signs cancel each other out the accumulative effect is not obtained.

In order to accumulate the frames without canceling the sign, two accumulation buckets A and B are prepared. The frames are alternately accumulated in the buckets, as is shown in FIG. 7, in order to collect in at least one bucket the frames whose signs are synchronized.

For example, the first I frame with the + sign is loaded into bucket A, and the second I frame with the − sign is loaded into bucket B. Since bucket B extends over the boundary at which an embedded sign is changed, when the second and the fourth frames are accumulated, they have opposite signs and cancel each other out, even though they have the same sign when collected. On the other hand, since the cycle of the signs collected in bucket A is not shifted away from the embedding cycle, exact values for the frames I can be collected in bucket A. Since no signs are shifted for bucket A, the three signs are collected in bucket A, while since one sign is shifted for bucket B, only one sign is collected after the signs are canceled.

Figure 5:
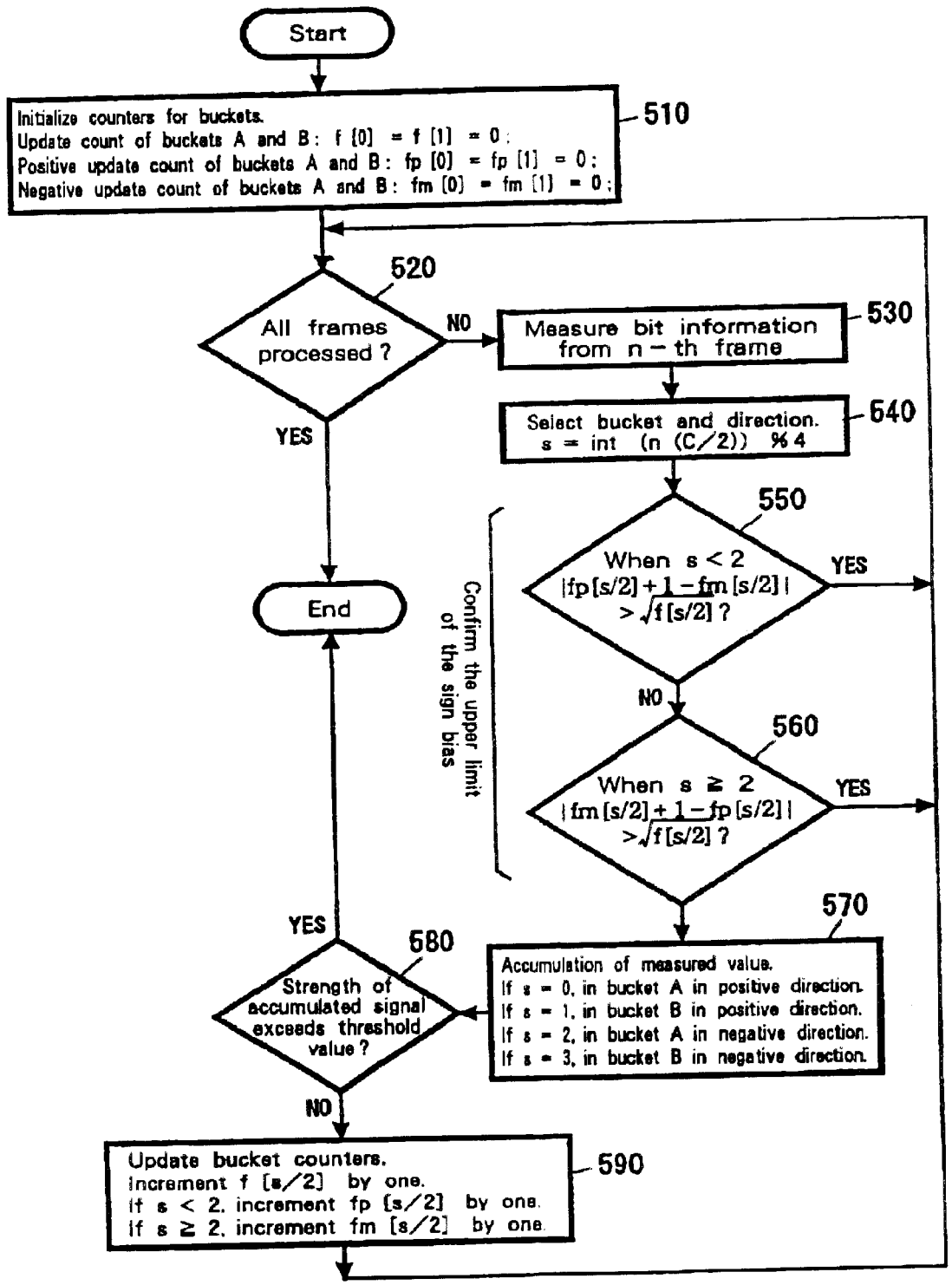
FIG. 5 is a flowchart for signal detection using the accumulation method when an embedding cycle and a detection cycle are not synchronized.

FIG. 5 is a flowchart for signal detection using an accumulation method when the embedding cycle and the detection cycle are not synchronized. First, at step 510 the count for the bucket is initialized while the sign inversion cycle is C. In this process, the arrangements that represent update counts for buckets A and B, the positive update counts for buckets A and B, and the negative update counts for buckets A and B are initialized. At step 520 a check is performed to determine whether all the frames have been processed. If the decision is YES, the processing is thereafter terminated. If the decision is NO, program control advances to step 530. At step 530 bit information is measured starting from the n-th frame and at step 540 the accumulation bucket and the direction are determined. At step 550 the upper limit of the sign bias when S is smaller than 2 is confirmed. Similarly, at step 560 the upper limit of the sign bias when S is equal to or greater than 2 is confirmed. When the decision at step 550 or step 560 is YES, program control returns to step 520. When no limit is established for the sign bias, program control advances to step 570, whereat the measured value is accumulated. When the measured value is s=0, it is accumulated in bucket A in the positive direction (addition); when s=1, the measured value is accumulated in bucket B in the positive direction (addition); when s=2, the measured value is accumulated in bucket A in the negative direction (subtraction); and when s=3, the measured value is accumulated in bucket B in the negative direction (subtraction). At step 570 a check is performed to determine whether the strength of the accumulated signal has exceeded the threshold value. When the result is YES, the processing is thereafter terminated. If the result is NO, program control advances to step 590, whereat the counter for the bucket is updated. Program control thereafter returns to step 520.

* Accumulation Method 2 When the Embedding Cycle and the Detection Cycle Are Not Synchronized In the above method, the two buckets are exclusively employed so as not to overlap as time elapses. In FIG. 8 is shown a method for a ¼ shift of the cycles for the two buckets and the overlapping of the buckets for use. For example, since only two of six signs are shifted a half cycle for bucket A, two remain after subtraction of the canceled signs. On the other hand, since only one of six signs is shifted for bucket B, four remain after the canceling of the signs. That is, it is apparent that at least one of the buckets can collect more than half of the signs. Generally, this collection capacity is higher than the exclusive collection capacity that was described for the previous method.

* Upper Limit for Restricting the Bias of Accumulated Signs

In the above two methods, the frames with inverted signs are not always alternately accumulated. When the frames with the same sign are accumulated sequentially, the canceling of correlation by the inversion of signs can not be performed, and the false/positive error ratio can not be predicted. To eliminate this problem, the accumulation of I frames must be skipped when this precipitates a bias in the accumulated signs. Whether a bias exists is determined by the following expression:

$$fp-fm<=f,$$

where fp and fm denote the number of frames having the signs + and −, and f denotes the sum (fp+fm). Since noise is accumulated at the speed f, as described above, so long as a difference fp−fm does not exceed that speed, the accumulation of frames having the same sign will not adversely affect the false/positive prediction.

Figure 10:
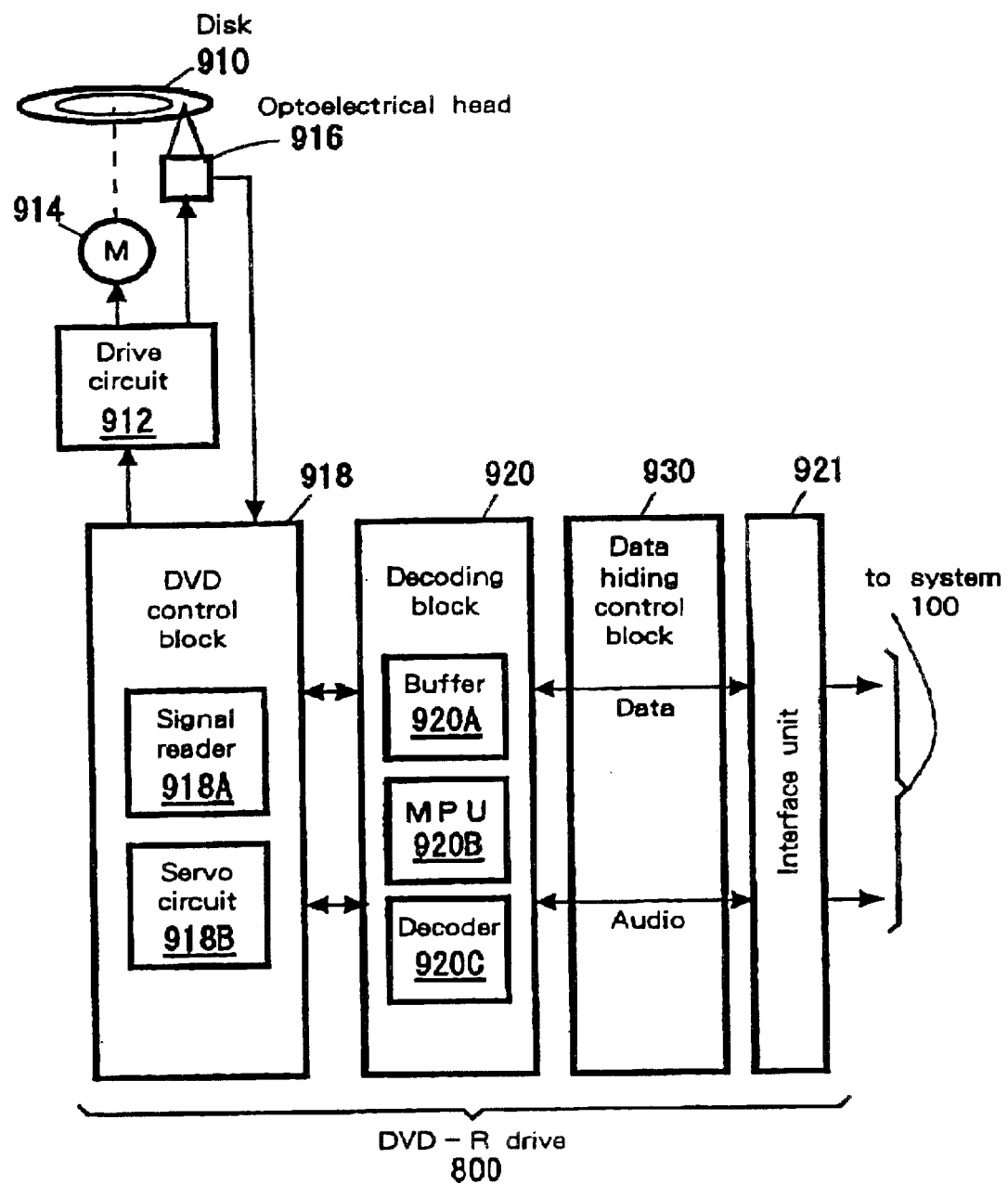
FIG. 10 is a diagram illustrating a DVD system having an electronic watermark control block according to one embodiment of the present invention.

FIG. 10 is a diagram illustrating one embodiment of a DVD-R drive system 800 including an electronic watermark control block 930. In FIG. 10, a disk 910 is rotated by a motor 914 that is connected to a drive circuit 912, and data recorded on the disk 910 are read by an optoelectrical head 916. The drive circuit 912 is operated in accordance with a command by a DVD control block 918. A signal read by the optoelectrical head 916 is transmitted to the DVD control block 918, whereat the signal is amplified, or is converted as needed, and the resultant signal is transmitted to a decoding block 920. The decoding block 920 performs modulation and demodulation of a received signal, and error correction. The DVD control block 918 includes: a servo circuit 918B, which receives either servo data recorded on the disk 910, or a control signal from the decoding block 920 to control the drive circuit 912; and a signal reader 918A.

Error correction and decoding in real time are performed for the data received by the decoding block 920 by a buffer 920A, an MPU 920B and a decoder 920C in the decoding block 920 that are connected by a common bus. The resultant data are transmitted to an electronic watermark control block 930. The electronic watermark control block 930 performs information embedding and embedded information detection, which are disclosed in the present invention. A data controller having a copying function may be added as needed. The data are transmitted from the electronic watermark control block 930 to a system 100 via an interface unit 921. The DVD-R drive system 800 can be operated independently, but may be operated while communicating with a system connected via the interface unit 921.

Figure 9:
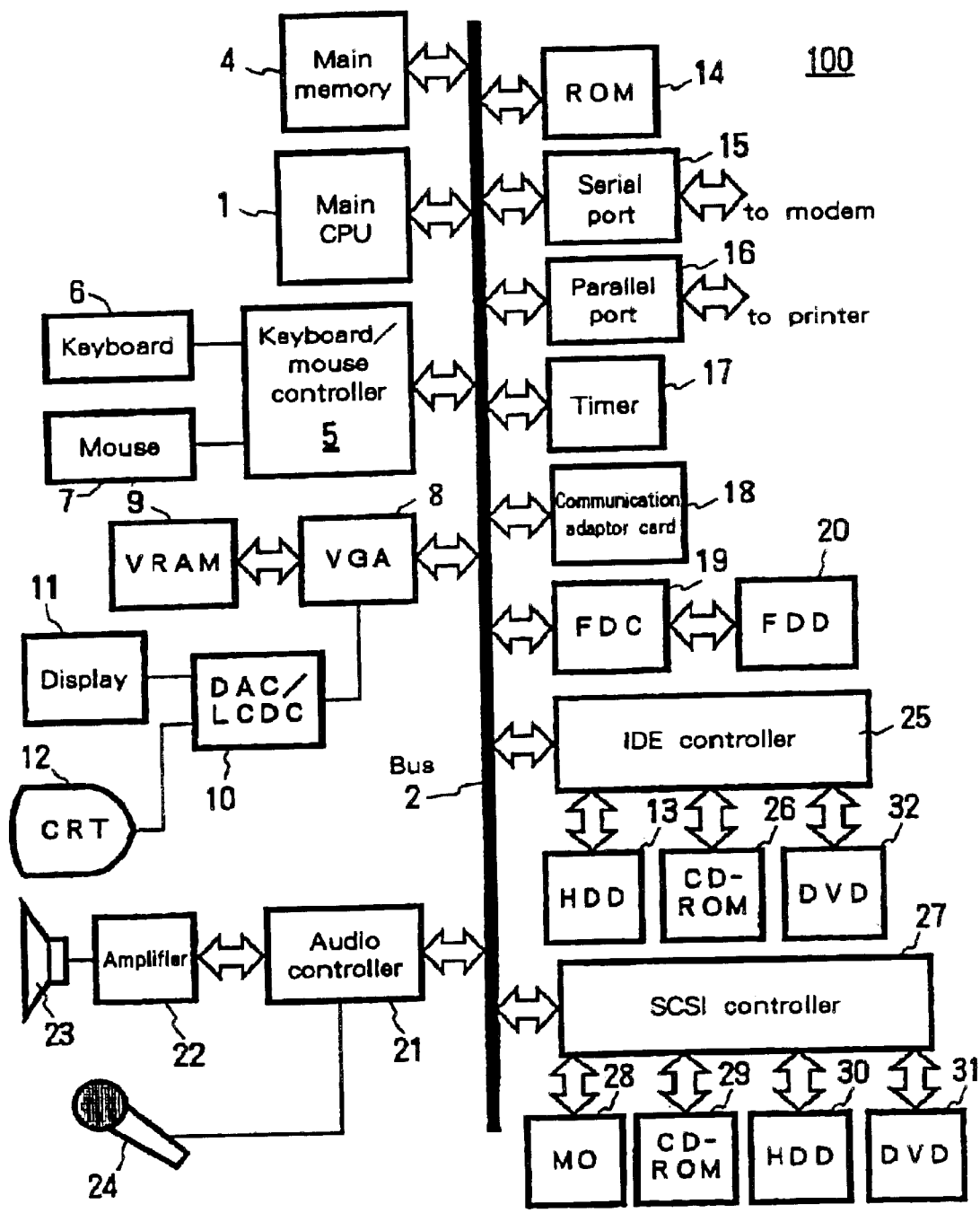
FIG. 9 is a diagram illustrating a hardware arrangement for a system of the present invention and a system that is connected thereto.

In FIG. 9 is shown an example hardware arrangement for a system 100 according to the present invention. The system 100 includes a central processing unit (CPU) 1 and a memory 4. The CPU 1 and the memory 4 are connected via a bus 2 and an IDE controller 25 to a hard disk drive 13 (or to a storage medium driver such as an MO, a CD-ROM or a DVD), which is an auxiliary storage device. Similarly, the CPU 1 and the memory 4 are connected via the bus 2 and a SCSI controller 27 to a hard disk drive 30 (or to a storage medium driver such as an MO 28, a CD-ROM 29 or a DVD 31), which is an auxiliary storage device. A floppy disk drive 20 is also connected to the bus 2 via a floppy disk controller 19.

A floppy disk is inserted into the floppy disk drive 20, and a computer program code or data, which interacts with an operating system and issues commands to the CPU 1, etc., for implementing the present invention, is stored either on the floppy disk or on a hard disk driver 13 (or another storage medium, such as an MO, a CD-ROM or a DVD) and in a ROM 14, and is loaded into the memory 4 for execution. The computer program code may be compressed, or may be divided into a plurality of segments and stored on a plurality of media.

The system 100 further includes user interface hardware components, such as a pointing device 7 (a mouse or a joystick) or a keyboard 6 for data entry, and a display 12 for providing visual data for a user. A printer and a modem can be connected to the system 100 via a parallel port 16 and a serial port 15, respectively. The system 100 can also be connected to a network via the serial port 15, the modem or a communication adapter 18 (an Ethernet or a Token Ring card) for communication with other computers. A remote controlled transceiver may be connected to the serial port 15 or to the parallel port 16 for the exchange of data using infrared rays or electric waves.

Via an amplifier 22, a loudspeaker 23 receives an analog audio signal, which is obtained by D/A (digital/analog) conversion performed by an audio controller 21, and outputs the audio as sound signal. The audio controller 21 receives audio data from a microphone 24 and performs an A/D (analog/digital) conversion of it, and also fetches external audio data.

It can be easily understood that the system 100, which can be connected to or communicate with the DVD-R drive system 800, of the present invention may be provided as an ordinary personal computer (PC), a workstation, a notebook PC, a palmtop PC, a network computer, a home electric appliance, such as a television that incorporates a computer, a game machine having a communication function, a telephone, a facsimile machine, a portable telephone, a PHS, a communication terminal, including a personal digital assistant, having a communication function, or a combination of such devices.

Figure 11:
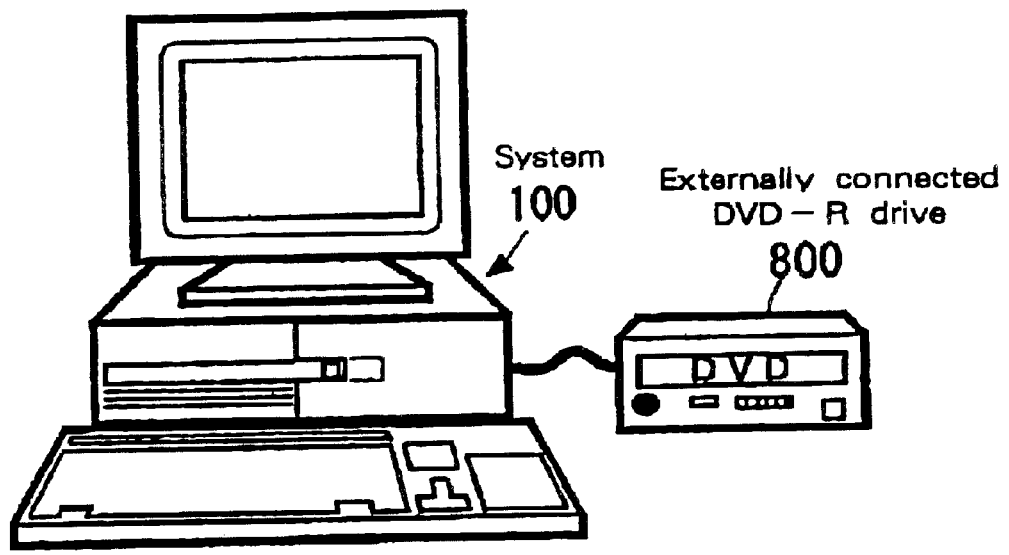
FIG. 11 is a diagram showing the DVD system externally connected to a system 100.
Figure 12:
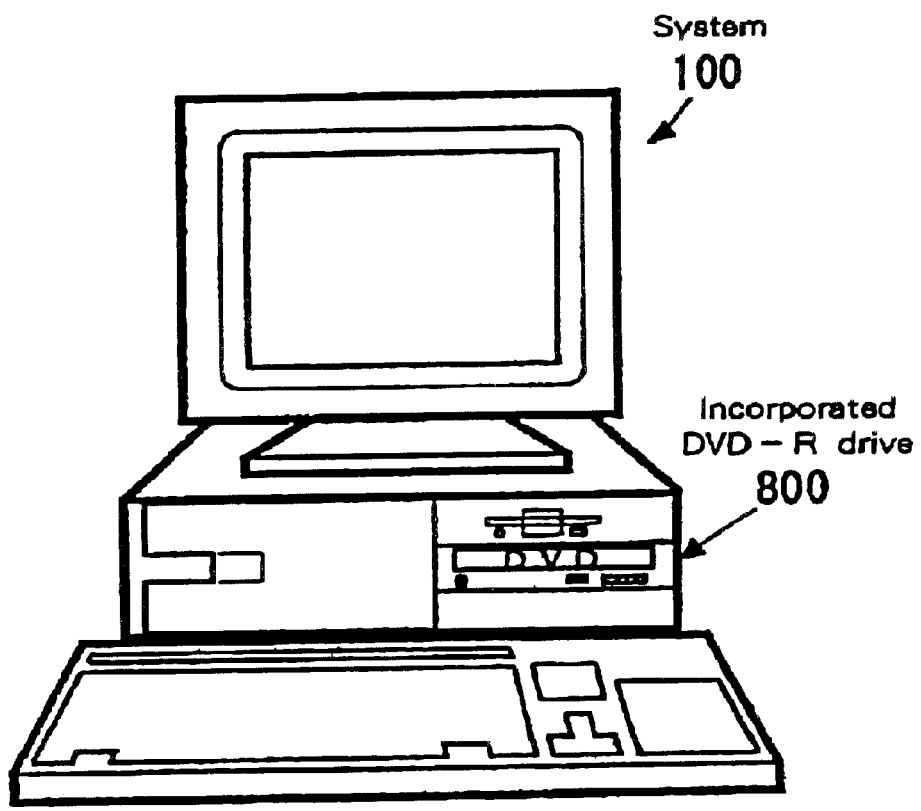
FIG. 12 is a diagram showing the DVD system incorporated in the system 100.

In FIG. 11 is shown the DVD-R drive system 800 that is externally connected to a data processing system 100, and in FIG. 12 is a shown the DVD-R drive system 800 that is incorporated in a data processing system 100.

Advantages of the Invention

A strong copy control signal must be embedded and hidden in DVD picture data to prevent the copy control signal from being erroneously read by a device. However, since the resolution of motion pictures is generally higher than that of still pictures, such an embedded, strong signal may be detected as noise. According to the method and the system of the present invention, instead of embedding a strong signal, signals that are weak enough to maintain the quality are embedded in frames and are accumulated until the signal strength reaches a satisfactory high level for detection purposes. Thus, the same reliability for extraction can be obtained as when strong signals are embedded.

While the DVD picture format is the MPEG2 format, a problem whereby an embedded signal is attenuated by this compression method by which a hidden signal may be lost can be resolved by employing the accumulation method and system of the present invention.

What is claimed is:

1. A motion picture electronic watermark system for embedding information in frames comprising:
   (1) means for preparing information to be imbedded as bits in a bit stream;
   (2) means for inversing each bit in said bit stream in accordance with a sign inversion cycle;
   (3) means for embedding said bit stream in said frames.

2. The motion picture electronic watermark system according to claim 1, wherein said means (2) includes means for adding sign bits to said bit stream.

3. A motion picture electronic watermark method for embedding information in frames comprising the steps of:
   (1) preparing information to be imbedded as bits in a bit stream;
   (2) inversing each bit in said bit stream in accordance with a sign inversion cycle;
   (3) embedding said bit stream in said frames.

4. A DVD system comprising a motor for a rotating disk; a pickup for reading and writing a signal on said disk; a drive circuit for controlling said motor and said pickup; a DVD control block for issuing a command to said drive circuit; a decoding block for performing signal conversion and error correction; and electronic watermark control block for embedding information or detecting embedded information; and an interface unit for communicating with an external device; said electronic watermark control block comprising:
   (1) means for preparing information to be imbedded as bits in a bit stream;
   (2) means for inversing each bit in said bit stream in accordance with a sign inversion cycle;
   (3) means for embedding said bit stream in said frames.

5. An article of manufacture comprising a computer usable medium having computer readable program code means embedded therein for causing information to be embedded in frames, said computer readable program code means in said article of manufacture comprising computer readable program code means for causing a computer to effect
   (1) preparing information to be imbedded as bits in a bit stream;
   (2) inversing each bit in said bit stream in accordance with a sign inversion cycle;
   (3) embedding said bit stream in said frames.

* * * * *